United States Patent [19]

Pitts

[11] Patent Number: 4,789,042
[45] Date of Patent: Dec. 6, 1988

[54] CONSTANT TENSION DEVICE

[76] Inventor: Michael W. Pitts, P.O. Box 552, Adamsville, Tenn. 38310

[21] Appl. No.: 23,774

[22] Filed: Mar. 9, 1987

[51] Int. Cl.⁴ .............................................. B62M 9/16
[52] U.S. Cl. ................... 180/231; 180/227; 280/284; 474/112; 474/116
[58] Field of Search ............... 180/227, 231, 217, 219; 280/276, 284, 283, 288; 474/112, 116

[56] References Cited

U.S. PATENT DOCUMENTS

| | | | |
|---|---|---|---|
| 707,923 | 8/1902 | Hedstrom | 474/112 X |
| 4,237,744 | 12/1980 | Jolly | 180/227 X |
| 4,541,502 | 9/1985 | Iwai et al. | 474/116 X |
| 4,614,507 | 9/1986 | Ishino | 474/112 X |

FOREIGN PATENT DOCUMENTS

| | | | |
|---|---|---|---|
| 101075 | 9/1923 | Switzerland | 180/231 |
| 2079892 | 1/1982 | United Kingdom | 474/112 |

Primary Examiner—John J. Love
Assistant Examiner—Charles R. Watts

[57] ABSTRACT

The application discloses a compensating mechanism for vehicles having two or more wheels with one of those driven wheels being pivotally mounted at the rear end of a swingarm. The compensating mechanism is comprised of a eccentric cam arrangement for the forward end of the swingarm to pivot on and a rocker arm with connecting members to interconnect the swingarm and the eccentric cam. A method of controlling the rotation of the eccentric cam with respect to the swingarm is also disclosed to allow the rear driven wheel to remain a fixed distance away from the engine driver sprocket as the swingarm moves with respect to the driver sprocket.

5 Claims, 3 Drawing Sheets

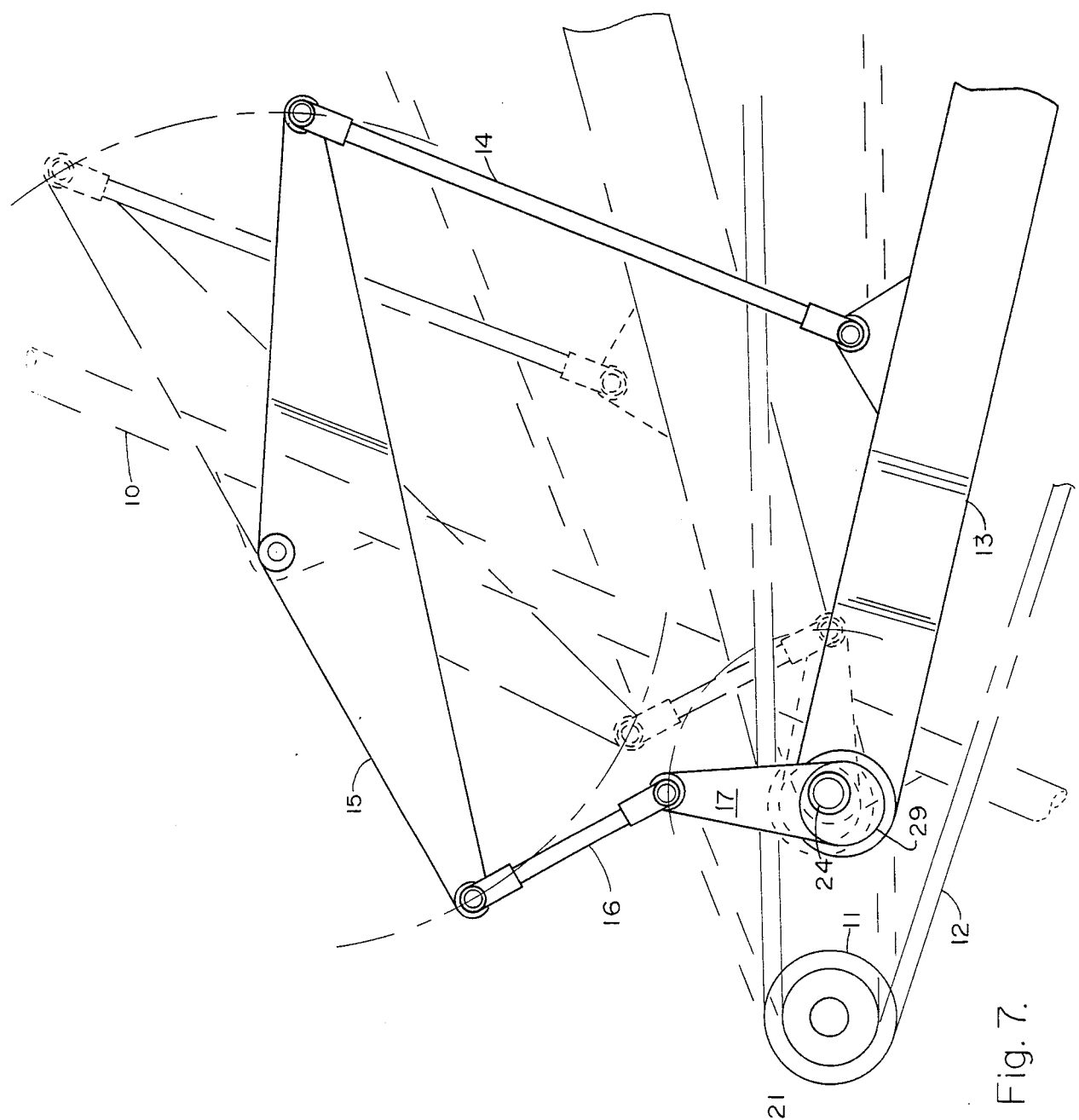

CONSTANT TENSION DEVICE

BACKGROUND AND STATEMENT OF OBJECT

On a vehicle having an engine mounted in a frame with at least one front wheel and at least one driven rear wheel pivotally mounted to the aft end of a swingarm, said swingarm having its forward end pivotally attached to the frame, and the power being transmitted to the rear wheel through a chain and sprocket arrangement, the current art is to mount the forward end of the swingarm to the frame at a location aft of the engine driver sprocket. The chain and sprocket arrangement consists of an engine driver, or countershaft sprocket, a rear driven sprocket attached to the rear wheel or rear axle, and an endless drive chain engaged around both the countershaft and driven sprockets. One end of a spring and shock absorbing device is also mounted to the swingarm and the other end of the device is attached to the frame. This arrangement allows the driven wheel and swingarm to move vertically, above and below, a normal straight-line disposition of engine countershaft sprocket, swingarm forward pivot, and rear wheel axle as the vehicle transverses rough or uneven terrain.

The distance from the centerline of the countershaft sprocket to the centerline of the driven sprocket, as measured at the normal straight-line disposition, is hereafter referred to as to the theorical radius.

Whereas, the forward pivotal end of the swingarm attaches to the frame at a location aft of the countershaft sprocket. This creates a condition where the actual arc generated by the sweep of the rear wheel as it moves vertically, upward or downward, from the straight-line position does not coincide at every point with the theorical arc generated by the theorical raduis as the rear wheel moves through its total amount of travel above and below the straight-line position. The two arcs, the actual and the theorical, only coincide at one point. This is when the swingarm is in its straight-line disposition. As the rear wheel moves vertically upward or downward from the straight-line position, the chain becomes slack because the actual radius is less than the theorical radius. It follows that the greater the amount of actual movement of the rear wheel above or below the straight-line position, the greater the amount of chain slack.

The invention proposes a mechanism that will allow the forward pivotal end of the swingarm to be mounted at a location aft of the engine countershaft sprocket, as is the current art, yet the invention also allows the rear wheel and drive sprocket to follow the theorical arc as generated by the theorical radius, thus keeping an ever taut chain.

The mechanisms required to maintain an ever taut chain consist of (1) an eccentric cam and attached lever arm, (2) a rocker lever, (3) a connecting rod from the cam lever arm to the rocker lever and (4) a connecting rod from the rocker lever to the swingarm. The cam is pivotally mounted to the frame at a location aft of the countershaft sprocket with the offset of the cam pointed directly toward the countershaft sprocket when the swingarm is in its straight-line position. The cam lever arm is torsionally attached to the cam and extents generally upward and rearward from the cam. The forward end of the swingarm is pivotally mounted to the cam and constructed so as not to interfere with the cam lever arm as the swingarm and cam move through their respective motions. The mounting provision for the swingarm connecting rod is located on the swingarm at a point between the forward pivotal mount and the rear axle mount.

The rocker arm consists of a member with provisions for a pivotal mount located on either end of the arm and a pivotal mount located between the two ends. The rocker arm is pivotally attached to the frame at a location on the frame generally above and aft of the cam pivot location. Attachment of the rocker arm to the frame is made using the middle pivotal mount of the rocker arm. The swingarm connecting rod is attached to the aft end pivotal mount of the rocker arm. The cam connecting rod is connected between the forward end of the rocker arm and the cam lever arm. The cam connecting rod is pivotally attached to both the rocker arm and the cam lever arm.

The intent of the above described members is to allow the swingarm to move at both the forward end and the aft end, but not equally, in such a manner that the aft and of the swingarm at the rear wheel pivot location follows the path of the theroical arc. The forward end of the swingarm moves in the same direction, up or down, as does the rear of the swingarm during the movement of the rear wheel. The movement of the forward end of the swingarm, however, is controlled by the movement of the cam. As the cam rotates on the pivot bolt, it forces the forward end of the swingarm to move, either up or down, depending on the aft end movement. As the cam forces the forward end up or down, the cam also moves the swingarm backwards a small amount. It is both the upward and backward movement that allows the rear of the swingarm to follow the arc created by the theroical radius.

The movement of the cam is controlled by the movement of the swingarm through the interconnected components. As the aft end of the swingarm moves upward from the straight line dispostion, the swingarm connecting rod forces the aft end of the rocker arm to also move upward. The forward end of the rocker arm, however, moves downward and through the cam connecting rod forces the cam lever arm down which in turn forces the cam to pivot upward. Exactly the opposite movements would result if the aft end of the swingarm moves downward.

The relative angular movement of the cam with respect to the angular movement of the swingarm is critical. Too much movement of the cam would force the rear of the swingarm beyond the length of the theorical raduis, and too little movement of the cam would not keep the chain taut. To achieve the correct amount of angular movement of the cam, all of the individual components are sized, based on their trigonometric relationship with the rest of the components. Once the components are correctly sized the invention maintains a taut chain regardless of the position of the rear end of the swingarm.

BRIEF DESCRIPTION OF DRAWINGS

FIG. 7 is an enlarged side elevation showing the movements of the components as the swingarm moves from the most downward position to its most upward position.

DETAILED DESCRIPTION OF DRAWINGS

Figure 1:
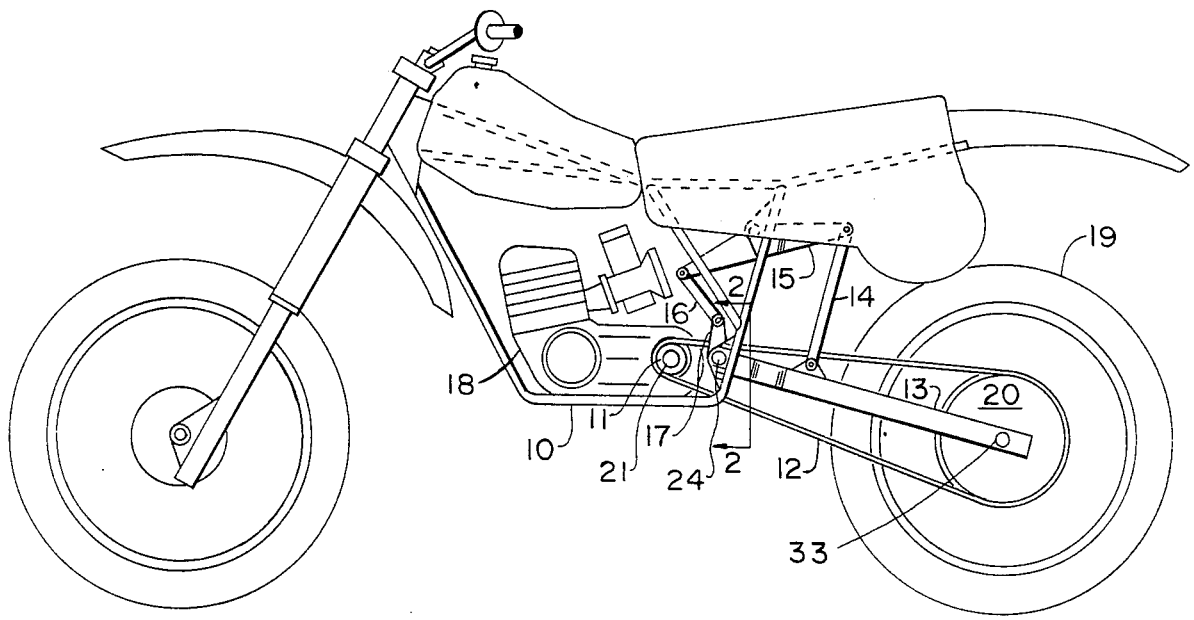
FIG. 1 is an outline side elevation of a motorcycle having a cam actuated constant tension device as disclosed in the present invention.

In the embodiment illustrated, the frame of the vehicle, in this case a motorcycle, is indicated by the reference numeral 10. The frame 10 is generally comprised of interconnecting framing members which provide for a mounting location for the vehicle's engine indicated at 18. The countershaft sprocket 11 is torsionally attached to the engine countershaft indicated by reference numeral 21. The countershaft sprocket 11 transmits the engine's 18 power to the rear driven sprocket 20 through the endless drive chain 12. The rear driven sprocket 20 is torsionally attached to the rear wheel 19.

The current art for motorcycles is to pivotally mount the rear wheel 19 to a forked member, normally referred to as a swingarm 13. An axle bolt 33 passes through one side of the swingarm and through the rear wheel 19, and driven sprocket 20, and out through the other side of the swingarm 13. Although this application references motorcycles, the general arrangement of an engine 18 located in a frame 10 with one or two rear wheels 19 mounted on swingarm 13 is widely used on three wheeled and four wheeled ATVs (All Terrain Vehicles). The basic difference between a motorcycle and the ATVs, as far as this application is concerned, is the arrangement of the mounting provisions for the rear wheel 19 or wheels. Since this application does not concern itself with the exact mounting method or number of rear wheels and is more concerned with the forward end of the swingarm 13, which is generally the same for a motorcycle or any other ATV, the principles of the invention can apply to both motorcycles and ATVs.

Figure 4:
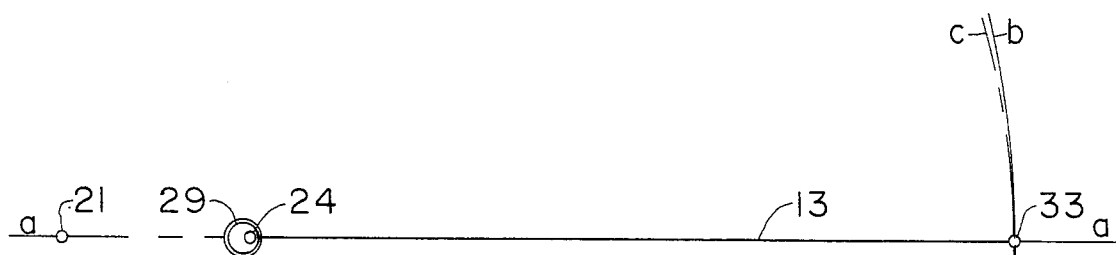
FIGS. 4, 5, and 6 are schematic views showing the relationship of the cam mechanism and swingarm in the normal straight line position, in the rear wheel vertically upward position, and in the rear wheel vertically down position.

FIG. 4 schematically represents the mechanism disclosed in this application in the straight-line position wherein the engine countershaft 21, the swingarm pivot bolt 24, the concentric cam 29, and the rear wheel axle bolt 33 all lie on a common line denoted by a—a. As the vehicle encounters uneven or rough terrain, the rear wheel 19 and swingarm 13 are disposed from the straight-line postion, either above or below, as indicated schematically in FIG. 5 and FIG. 6, respectfully. Arc b—b represents the theorical arc that the rear wheel 19 must follow in order to maintain a constant tension on the drive chain 12. Arc c—c represents the arc that a rear wheel 19 would follow on a conventional vehicle with a swingarm pivot bolt located at the same location as is the cam pivot bolt 24 in this application. The greater the distance that the rear wheel 19 travels away from the straight-line position, the greater the amount of divergence between arc b—b and arc c—c.

Figure 5:
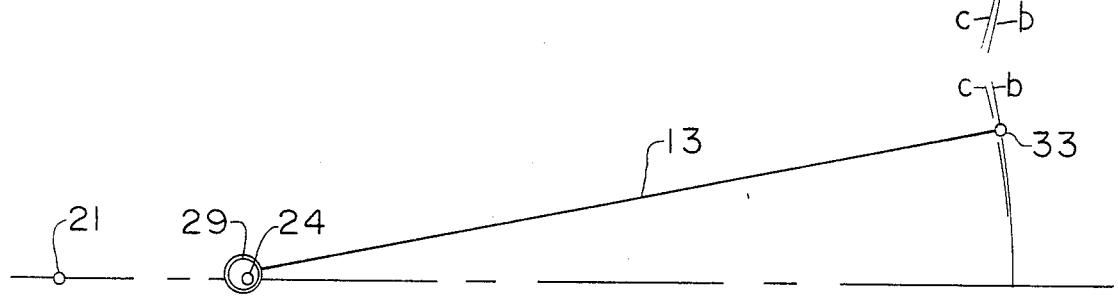

In FIG. 5 the eccentric cam 29 is shown rotated upward about the cam pivot bolt 24. The rotation of the cam 29 forces the rear of the swingarm 13 and thus the rear wheel axle 33 to follow the theorical arc b—b. As the swingarm 13 moves downward from the straight-line position, as shown in FIG. 6, the cam 29 rotates downward to force the swingarm 13 and the rear wheel axle bolt 33 to again follow the theorical arc b—b.

Figure 6:
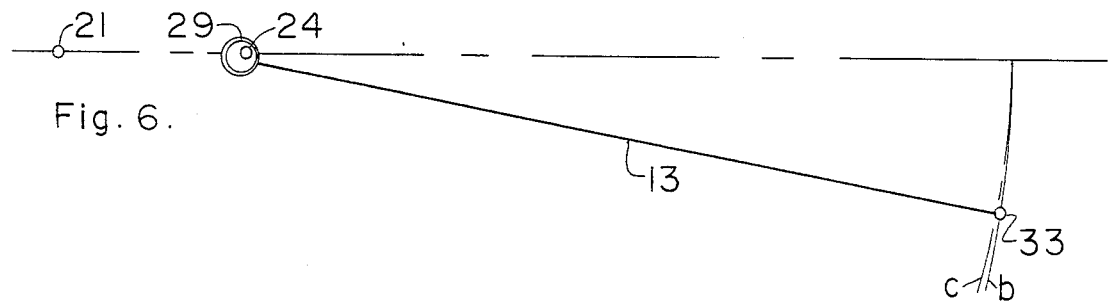

FIGS. 4, 5, and 6 are shown to depict the basic concept of this application and are not intented to show the control members, which are discussed later in this application.

Figure 2:
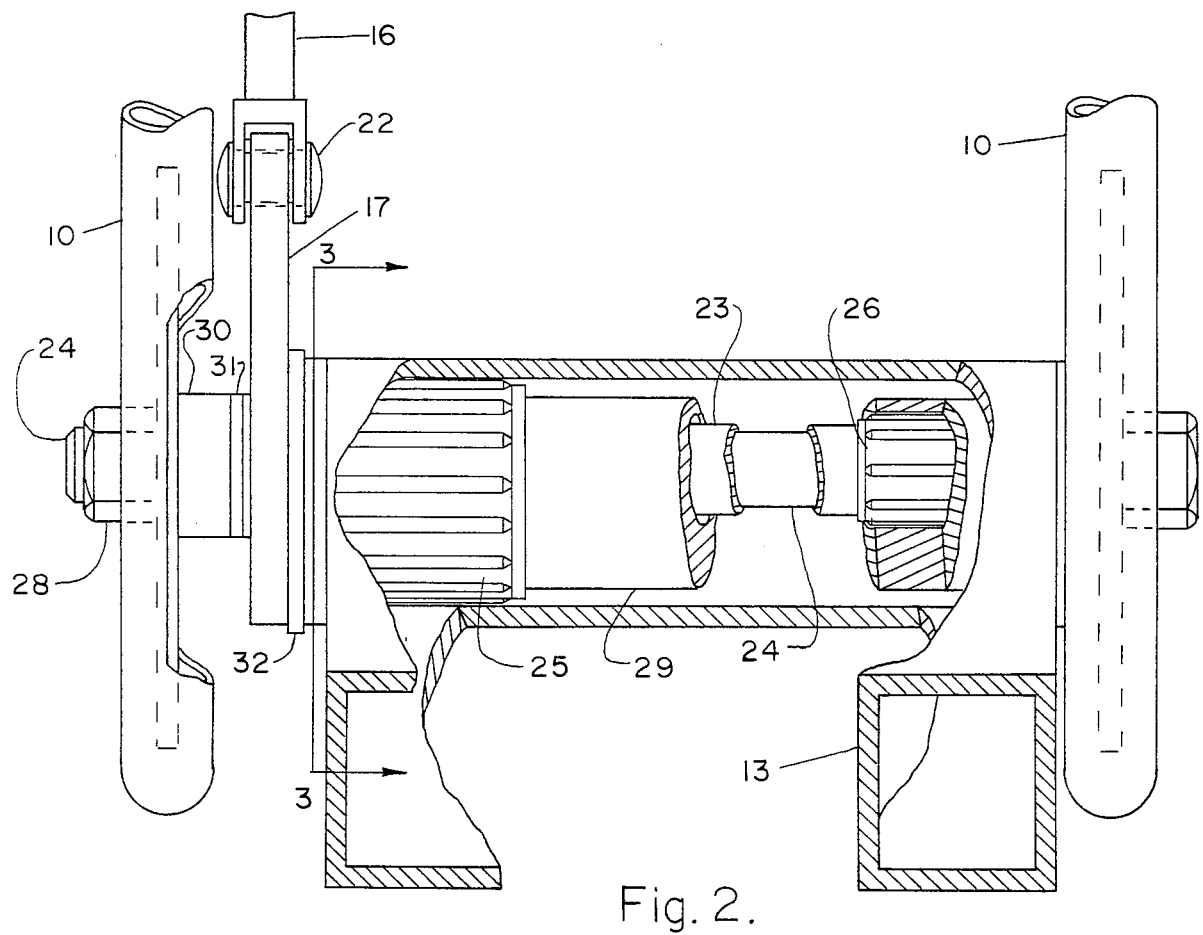
FIG. 2 is an enlarged and cutaway elevation view of the forward end of a swingarm and the associated components provided according to the present invention.

The forward end of the swingarm 13 is pivotally attached to the cam 29 at a location aft of the vehicle's engine 18. The general arrangement of the forward, or pivot end, of the swingarm is illustrated in FIG. 2. A cylindrical section of the swingarm 13 extends nearly the width of the space between the frame 10 members and lies in a plane parallel to the countershaft 21. Housed within the cylindrical section of the swingarm 13 are the swingarm bearings 25, the concentric cam 29, the cam pivot bearings 26, the cam spacer sleeve 23, and the cam pivot bolt 24. Located on both sides of the swingarm 13 is a dust seal 32 to keep any foreign material from entering into the cylindical section of the swingarm 13 and contaminating the swingarm bearings 26 and the cam bearings 26. The cam lever arm 17 is torsionally attached to the cam 29. A swingarm spacer 30 and a swingarm thrust bearing 31 are provided to keep the cam 29 and the swingarm 13 in the correct alignment with the countershaft sprocket 11 and the rear axle sprocket 20.

The cam 29 extends through the distance of the cylindrical section of the swingarm 13. The swingarm bearings 25 are located at both ends of the cam 29 and between the cam 29 and the swingarm 13. For clarity only, one set of bearings are shown in FIG. 2. The swingarm bearings 25 allow the swingarm 13 to freely pivot on the cam 29. Inside the cam 29 and located at both ends of the cam 28, are the cam pivot bearings 26. These bearings allow the cam to freely pivot on the cam spacer sleeve 23. Again, only one bearing is shown for clarity.

Figure 3:
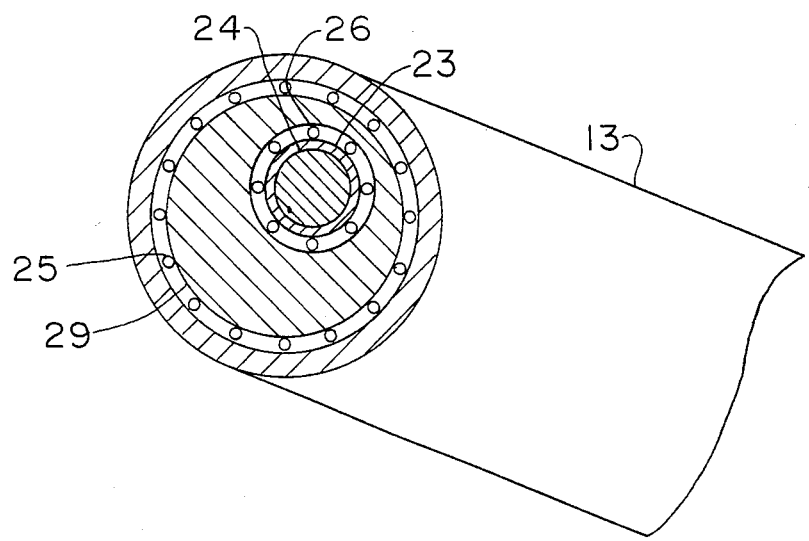
FIG. 3 is a sectional view of the forward end of a swingarm as indicated by section line 3—3 on FIG. 2.

The purpose of the cam spacer sleeve 23 is twofold. Not only does it provide for a bearing surface for the cam pivot bearings 26, but is also keeps the frame members 10 spaced the correct distance apart so the cam 29 and the swingarm 13 are free to pivot with respect to each other. The cam spacer sleeve extends from the mounting plate on the frame 10 located on one side of the swingarm 13, through the dust seal 32, through the cam 29, through the other dust seal 32, through the cam lever arm 17, through the thrust bearing 31, and through the swingarm spacer 30 to the other mounting plate on the frame 10 located on the other side of the swingarm spacer 30. This arrangement allows the cam pivot bolt 28, which extends through the cam spacer sleeve 23 and the mounting plates on the frame 10, to be tightened with the nut 28 and provides a secure yet pivotal attachment of the swingarm 13 and cam 29 to the frame 10. FIG. 3 illustrates the relationship of the swingarm 13, the cam 29, the swingarm bearings 25, the cam bearings 26, the cam spacer 23, and the cam pivot bolt 28.

For the eccentric cam 29 to function properly to control the forward end of the swingarm 13, its rotation must be precisely controlled by the movement of the aft section of the swingarm 13. The movement of the eccentric cam 29 is propagated through the interconnected members of the swingarm connecting rod 14, the rocker arm 15, the cam connecting rod 16, and the cam lever rod 17 by the movement of the swingarm 13. As the swingarm 13 begins to rotate on the eccentric cam 29, the rocker arm 15 is also forced to move by the swingarm connecting rod 14. The rocker arm 15, in turn, forces the cam 29 through the cam connecting rod 16, and the cam lever arm 17 to rotate. The relative amount of rotation of the cam 29 with respect to the swingarm 13 is determined by the lengths of all the members, as well as their angular relationship with one another. FIG. 7 illustrates the movements of the various components as the swingarm moves from its most downward position to its most upward position.

I claim:

1. In a vehicle having a frame, an engine with a driver sprocket, at least one wheel having a driven sprocket rigidly attached thereto, said at least one wheel being driven by an endless chain engaged around both the driver and driven sprockets, and improved suspension system comprising:

an eccentric cam, with first and second ends, pivotally attached to the vehicle at a location aft of the engine driver sprocket;

means for controlling vertical movement of said at least one wheel by rotating said eccentric cam in the same direction as said at least one wheel such that said at least one wheel remains a constant distance from said driver sprocket irregardless of the vertical position of said at least one wheel with respect to said frame; said controlled means including:

a suspension means, with forward and rearward ends, pivotally attached at its forward end to said eccentric cam for rotatably mounting said at least one wheel on an axle at said rearward end, a cam lever arm, with first and second ends, rigidly connected at its first end to one end of said eccentric cam, a cam connecting rod, with first and second ends, pivotally attached at one end to the second end of said cam lever arm, a rocker arm, having forward and rearward ends, pivotally attached at a middle point thereof to the vehicle frame and pivotally attached at one end to the second end of said cam connecting rod, and a swing arm connecting rod pivotally attached at a first end to the other end of said rocker arm and at a second end to a mount on said suspension means.

2. A suspension system as defined in claim 1 in which the rocker arm mounts to said frame at a location generally above and aft of the driver sprocket.

3. A suspension system as defined in claim 1 in which the cam connecting rod is pivotally attached at the forward end of the rocker arm.

4. A suspension system as defined in claim 1 in which the swingarm connecting rod is pivotally attached at the rearward end of the rocker arm.

5. A suspension system as defined in claim 1 in which said mount on said suspension means is located between said eccentric cam and said axle.

* * * * *